(12) United States Patent
Becker

(10) Patent No.: US 6,279,530 B1
(45) Date of Patent: Aug. 28, 2001

(54) METHOD FOR TRIGGERING THE CONTROLLING ELEMENTS OF AN INTERNAL COMBUSTION ENGINE

(75) Inventor: Ruediger Becker, Murr (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/369,652

(22) Filed: Aug. 6, 1999

(30) Foreign Application Priority Data

Aug. 7, 1998 (DE) .............................................. 198 35 741

(51) Int. Cl.$^7$ ....................................................... F02B 31/00
(52) U.S. Cl. ................ 123/306; 123/184.56; 123/568.21
(58) Field of Search ............................... 123/184.56, 478, 123/306, 399, 90.17, 568.21

(56) References Cited

U.S. PATENT DOCUMENTS

| | | | |
|---|---|---|---|
| 5,432,701 | * 7/1995 | Mayer et al. .......................... | 123/478 |
| 5,495,840 | * 3/1996 | Ohtsuka et al. ....................... | 123/478 |
| 5,555,865 | * 9/1996 | Kim .................. | 123/184.56 |
| 5,575,248 | * 11/1996 | Tada .................. | 123/184.56 |
| 5,832,896 | * 11/1998 | Phipps .................................. | 123/478 |
| 6,089,206 | * 7/2000 | Suzuki et al. ......................... | 123/305 |

* cited by examiner

*Primary Examiner*—John Kwon
(74) *Attorney, Agent, or Firm*—Kenyon & Kenyon

(57) ABSTRACT

There are a number of controlling elements of an internal combustion engine which have an influence on the charge of the cylinders. For each controlling element, a triggering instant is determined that is adapted to its individual reaction time, so that all the controlling elements simultaneously deploy their action influencing the charge. In this manner, a desired charge is attained at a defined instant, thus permitting a harmonious adjustment of the charge to other operating parameters. This optimizes the driving properties, the performance and the fuel consumption of the internal combustion engine.

4 Claims, 2 Drawing Sheets

METHOD FOR TRIGGERING THE CONTROLLING ELEMENTS OF AN INTERNAL COMBUSTION ENGINE

BACKGROUND INFORMATION

In an internal combustion engine, the charge of the cylinders is mainly controlled by way of the throttle valve in the induction pipe. However, there are a number of other controlling elements which have an influence on the charge, as well. In particular, they are controlling elements which are used to improve the driving properties, or to ensure operation of the internal combustion engine which is optimized from the standpoint of performance and fuel consumption. Belonging to these controlling elements are, e.g., an exhaust-gas recirculation valve, a device for changing the geometry of the induction pipe, a device for changing the position of the camshaft, and a device for the adjustment of swirl valves in the intake ports of the cylinders. The influences of all these controlling elements on the charge are very different. The result is that, in response to a change in the engine load, a change takes place in the charge which is not in harmony with other operating parameters of the engine such as the ignition-advance angle, the start of injection or the injection quantity. This phenomenon leads to a deterioration in drivability, and also does not allow operation of the engine which is optimized from the standpoint of performance and consumption.

Therefore, an object of the present invention is to provide a method by which the driving properties are improved and which permits an operation of the engine which is optimized from the standpoint of performance and fuel consumption.

SUMMARY OF THE INVENTION

According to the present invention, for each controlling element, a triggering instant is determined which is adapted to its individual reaction time, so that all controlling elements simultaneously deploy their action influencing the charge. This measure makes it possible to achieve a desired charge at a defined point of time, so that a clear time relation to the change of other operating parameters can be attained.

The triggering instant for each controlling element can be determined as a function of the engine speed. The controlling element can be triggered when a specific lead speed is reached which is before a setpoint speed at which the charge must have reached its setpoint value. To that end, a setpoint speed is ascertained corresponding to the driver's input, a speed gradient is ascertained from the instantaneous speed and the setpoint speed, and the individual lead speed for each controlling element is derived from the setpoint speed and the speed gradient, taking into account the reaction time of the controlling element.

DETAILED DESCRIPTION

Figure 1:
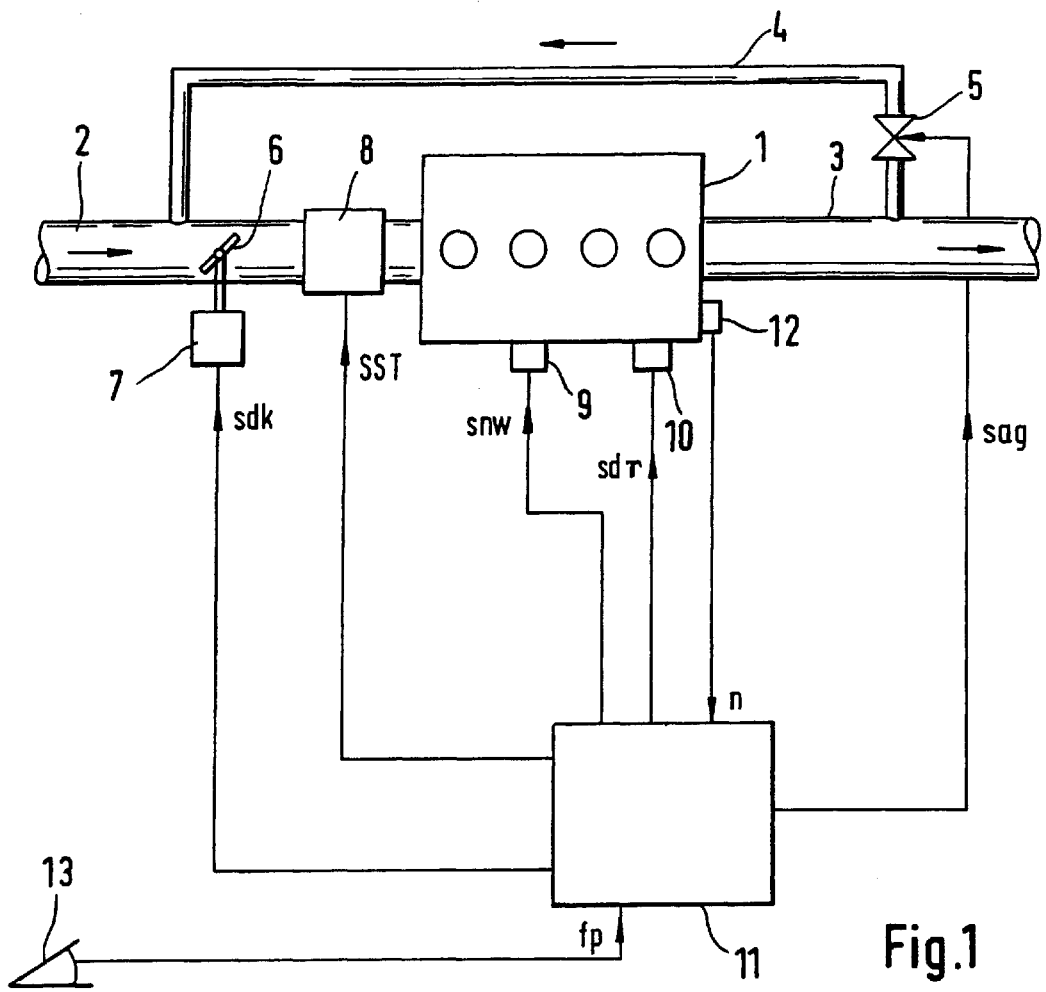
FIG. 1 shows a block diagram of an internal combustion engine having various controlling elements.

An internal combustion engine 1, having an induction pipe 2 and an exhaust duct 3, is shown schematically in FIG. 1. An exhaust-gas recirculation duct 4 leads from exhaust duct 3 to induction pipe 2. An exhaust-gas recirculation valve 5 is inserted in exhaust-gas recirculation duct 4 as a controlling element for adjusting the exhaust-gas recirculation rate. As German Patent No. 196 256 88 describes, such an exhaust-gas recirculation is used to increase performance and to improve the exhaust-gas emission of an engine.

Located in induction pipe 2 is a throttle valve 6 whose opening is controllable by a controlling element 7. Block 8 indicates the arrangement of a controlling element for changing the geometry of the induction pipe, and block 9 symbolizes a device for adjusting the camshaft. As German Patent No. 44 35 741 describes, adjusting devices for the induction-pipe geometry and for the camshaft setting, respectively, are used to increase engine output, to reduce fuel consumption and to improve exhaust-gas emission.

Block 10 indicates a device for the adjustment of swirl valves arranged in the individual intake ports of the cylinders. Such swirl valves are usually provided in internal combustion engines with direct fuel injection in order to attain a certain mixture turbulence in the combustion chambers of the individual cylinders.

All the indicated controlling elements 5, 7, 8, 9, 10 have an influence on the charge of the individual cylinders. However, they have very different reaction times, so that the charge changes produced by the individual controlling elements become effective at different times. Without the method yet to be described in detail with reference to FIG. 2, there is no defined point of time at which a desired setpoint charge of the cylinders is reached. An engine control unit 11 triggers each of the indicated controlling elements 5, 7, 8, 9, 10 as a function of time, taking into account the reaction times of the individual controlling elements, so that the charge reaches its setpoint value at a quite specific point of time. Exhaust-gas recirculation valve 5 receives control signal sag, controlling element 7 for throttle valve 6 receives control signal skd, controlling element 8 for the induction pipe geometry receives control signal SST, controlling element 9 for the camshaft adjustment receives control signal snw, and controlling element 10 for the swirl valves receives control signal sdr. In addition, engine speed n sensed by an engine speed sensor 12, and position fp of gas pedal 13 representing the driver's input are supplied to engine control unit 11.

Figure 2:
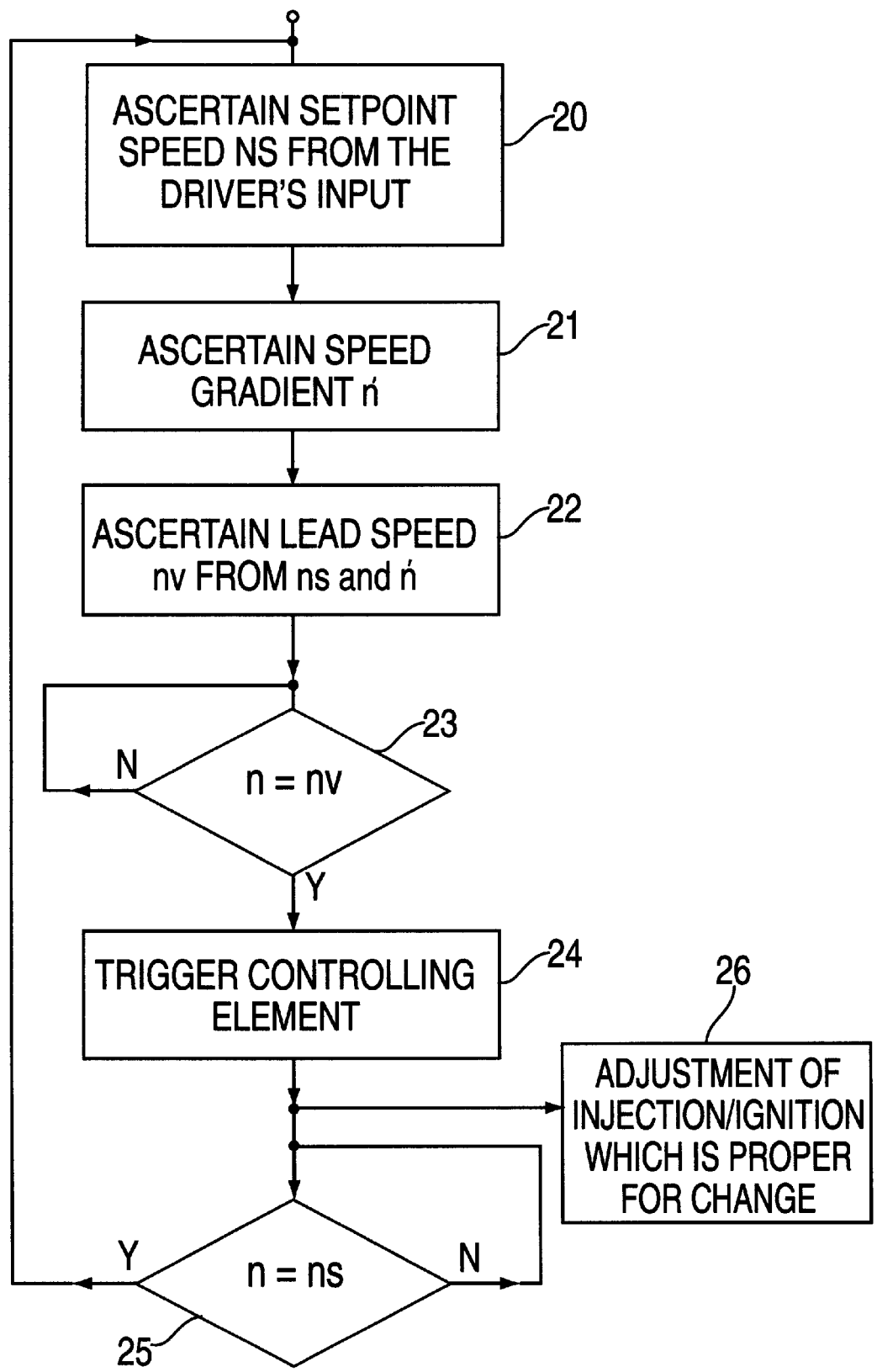
FIG. 2 shows a flow chart for the triggering of the controlling elements.

In order to implement a timed, individual triggering of the various controlling elements to achieve a change in the charge at a defined instant, the following method, presented in FIG. 2, is performed in engine control unit 11.

In a first method step 20, the driver's input fg is detected and a setpoint speed ns is ascertained therefrom. A specific setpoint speed ns can be allocated to each driver input, i.e., to each position of the gas pedal. Setpoint speed ns is preferably derived from a family of characteristics which is a function of gas-pedal position fp.

Figure 3:
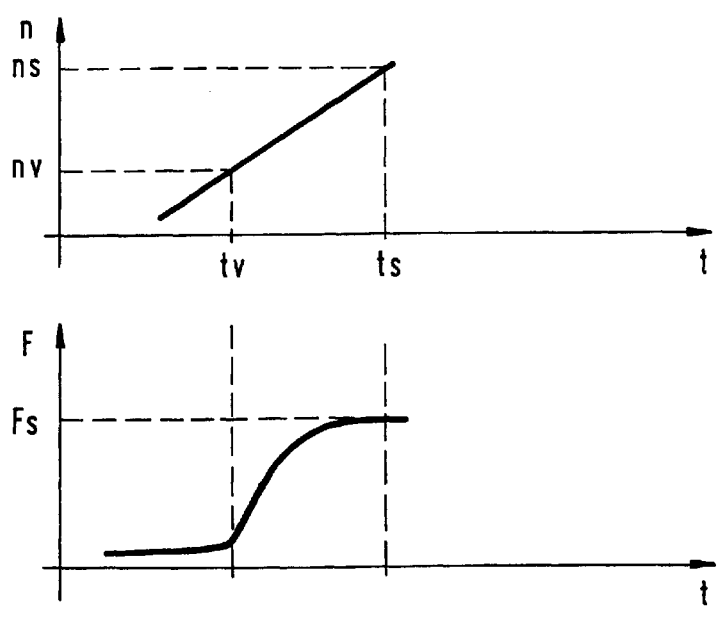
FIG. 3 shows a speed characteristic and a charge characteristic.

In second method step 21, a speed gradient n is ascertained from the prevailing speed, i.e., instantaneous speed n, and from setpoint speed ns. According to the third method step 22, a lead speed nv is derived from setpoint speed ns and from speed gradient n. This lead speed nv is ascertained individually for each controlling element. Lead speed nv corresponds to an instantaneous speed which is before the actual setpoint speed at which a setpoint value of the charge should be reached. Speed pattern n, shown in FIG. 3, clarifies the relative position of lead speed nv and of setpoint speed ns. One can see that setpoint speed ns is reached at instant ts. Lead speed nv is already reached at instant tv which is before instant ts. The diagram shows clearly that the interval between the two instants ts and tv is a function of the speed gradient. That is to say, the greater the speed gradient n, the further lead speed nv is before setpoint speed ns, in order to achieve the time interval between ts and tv predefined by the reaction time of the respective controlling element. Ideally, for each controlling element there is a family of characteristics which is a function of setpoint speed ns and speed gradient n, and from which lead speed nv can be gathered. Charge characteristic F shown in FIG. 3 clarifies again that, if a controlling element is triggered at instant tv, the charge reaches its setpoint value Fs punctually at instant ts.

In the fourth method step 23, it is queried whether instantaneous speed n has reached lead speed nv. If this is so, in the next method step 24, the respective controlling element to which lead speed nv is allocated is triggered. The charge change resulting after the triggering of individual or all the controlling elements is converted by appropriate adjustment of the injection time and/or of the ignition-advance angle. As shown by block 26 in FIG. 2, this procedure is carried out directly after method step 24.

In the last method step 25, it is queried whether instantaneous speed n has reached setpoint speed ns. Namely, if this is the case, charge setpoint value Fs is reached, and specifically on condition that each controlling element has been triggered at lead speed nv ascertained for it individually. The triggering process for the controlling elements can then be started anew, beginning with the detection of the driver's input.

What is claimed is:

1. A method for triggering a plurality of controlling elements of an internal combustion engine which have an influence on a charge of cylinders of the engine, comprising the steps of:

for each of the controlling elements, determining a triggering instant as a function of a reaction time of each of the controlling elements, respectively; and triggering the controlling elements as a function of the triggering instants, such that all of the controlling elements simultaneously deploy an action influencing the charge.

2. The method according to claim 1, wherein the triggering instant for each of the controlling elements is determined as a function of a speed of the engine.

3. The method according to claim 1, further comprising the steps of:

ascertaining a setpoint speed corresponding to an input of a driver;

ascertaining a speed gradient from an instantaneous speed and the setpoint speed;

for each of the controlling elements, deriving an individual lead speed from the setpoint speed and the speed gradient, taking into account a reaction time of the controlling element; and triggering at least one of the controlling elements in response to reaching the lead speed.

4. The method according to claim 1, wherein the controlling elements include at least one of:

a throttle valve;

an exhaust-gas recirculation valve;

a first device for changing a geometry of an induction pipe;

a second device for changing a position of a camshaft; and a third device for adjusting swirl valves in intake ports of the cylinders.

* * * * *